(No Model.)
C. G. MAYER.
REFRIGERATING MACHINE.
No. 311,506. Patented Feb. 3, 1885.
*Fig. 1.*
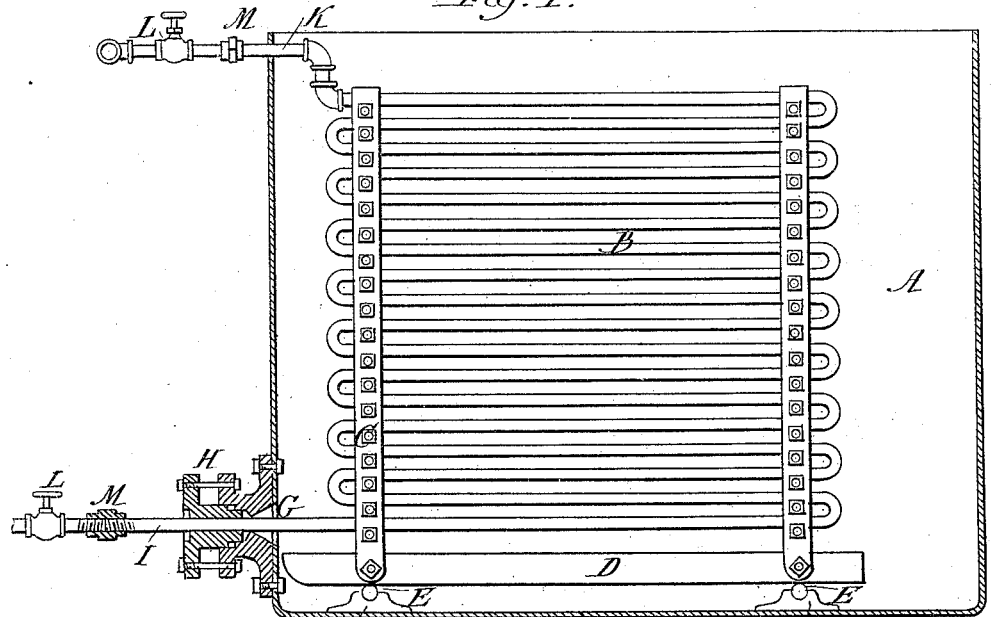
*Fig. 2.*
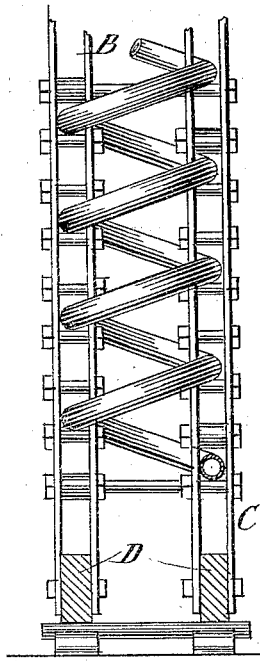
*Fig. 4.*
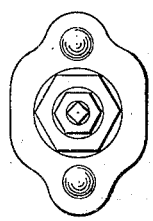
*Fig. 3.*
*Fig. 5.*
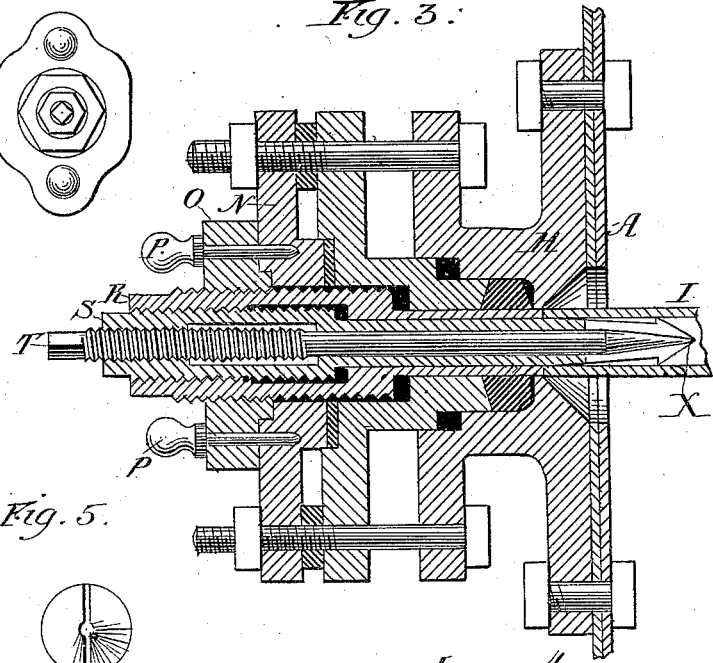
Witnesses:
Frank B. Blanchard
Francis W. Parker.
Inventor:
Charles G. Mayer

UNITED STATES PATENT OFFICE.

CHARLES G. MAYER, OF NAUVOO, ILLINOIS.

REFRIGERATING-MACHINE.

SPECIFICATION forming part of Letters Patent No. 311,506, dated February 3, 1885.

Application filed December 1, 1884. (No model.)

*To all whom it may concern:*

Be it known that I, CHARLES G. MAYER, of Nauvoo, Hancock county, Illinois, and a citizen of the United States, have made certain new and useful Improvements in Refrigerating-Machines, of which the following is a full, clear, and exact description, reference being had to the accompanying drawings.

My invention relates to the cooling coils and tanks used in such machines; and its object is to provide means whereby the coils may be easily removed and readily restored to their positions after repair.

It consists, among other features, of a compound plug, which is used to close the return-pipe aperture, and which also grips the end of the pipe and draws it into the aperture when the coil is to be restored to its position.

My invention is illustrated in the accompanying drawings, wherein Figure 1 is a side view of the coil and sectional view of the tank and parts which surround the return-pipe aperture, and Fig. 2 is an end view of the coil, showing the slides and the roller on which they rest. Fig. 3 is a sectional view of the parts which surround the return-pipe aperture and the plug. Fig. 4 is an end view of the plug and nut. Fig. 5 is a detail view of the point of the barbed piece.

In Fig. 1 the parts are in the position in which they are used. In Fig. 2 the return-pipe is shown at the moment when it is centered on the aperture, and when the barb has been thrust forward and expanded to grip the pipe, as explained hereinafter.

Like parts are indicated by the same letter in all the views.

A is the tank; B, the coils; C, the coil-frame; D, the slides at the lower extremity of the frame; E, the rollers, and F the stools on which they rest; G, the conical aperture in the tank; H, the stuffing box which surrounds the same, and is secured to the side of the tank; I, the return-pipe; K, the feed-pipe; L L, valves which control them; M M, couplings; N, a flange held in position by the same bolts which are used to draw the stuffing-box gland to its place; O, a nut recessed into same and provided with pin-holes to receive the pins P P, whereby the nut may be held in position and not permitted to rotate. R is the shell of the plug, screw-threaded into the nut O. S is a barbed piece, screw-threaded within the shell. T is a wedge screw-threaded within the barbed piece. The shell, the barbed piece, and the wedge are each made so as to receive a wrench whereby to be rotated. The end of the barbed piece is split, so as to permit it to spread. X is the barb thereon.

The use and operation of my improvements are as follows: When the coil is to be removed for repairs or other purpose, the valves are closed and the pipes uncoupled, and the coil moved back until the return-pipe is withdrawn from its aperture. As this is done the plug is screwed into the aperture to close it. When the coil is to be restored to its place, it is lowered into the tank until the end of the return-pipe strikes the conical aperture or recess, when it starts forward and centers itself on its aperture against the end of the shell of the plug, as shown in Fig. 3. The barbed part is then screwed forward into the pipe, and when far enough within the same the wedge is screwed forward, so as to spread the barbed point and cause the same to grip the inner walls of the pipe. The pins are then withdrawn from the nut and the same is turned, so as to cause the entire plug to retreat, whereby the return-pipe and coil are drawn forward into their proper places. The nut is used in this manner to permit the barbed point to be withdrawn without rotating. In this manner the pipe is protected from injury.

The conical recess and aperture are designed to obviate the necessity of guides on the side of the tank, which have been used. The rollers supported on the bottom of the tank by stools with broad bearings will cause much less injury to the tank than if the coils were supported by rollers on their supporting-frames. Another feature of my invention is the compound plug, whereby the end of the return-pipe is drawn forward into position.

This form of device I have devised in order to substitute it for that shown in my Patent No. 256,349, dated April 11, 1882, which is impracticable for use in the case of heavy coils, because of the great difficulty of forcing the coil forward by means of levers.

What I claim as my invention is as follows:

1. In a refrigerating-machine, the combination of a brine-tank, a cooling-coil provided at its lower end with supporting-slides, rollers which rest on stools on the bottom of the tank, and a compound plug adapted to close the return-pipe aperture when the coil is removed and to grip and draw the pipe into place when the coils are being restored to place.

2. In a refrigerating-machine, the combination of a removable coil and a tank provided with a conical recess about the return-pipe aperture, which serves as a guide for the return-pipe.

3. In a refrigerating-machine, the combination of a removable coil, supported on a frame provided with slides, with rollers which rest on stools on the bottom of the tank.

4. In a refrigerating-machine, the combination of a removable coil with a compound plug, which closes the return-pipe aperture when the coil is removed, and which draws in the end of the pipe when the coil is being restored to position.

5. In a refrigerating-machine, the combination of compound plug, as and for the purpose described, with a tank provided with a conical recess terminating in the return-pipe aperture, and a removable coil.

6. In a refrigerating-machine, a plug composed of an outer shell, a barbed piece screw-threaded within the shell, and a wedge screw-threaded within the barbed piece, as and for the purpose described.

In witness whereof I have hereunto set my hand, at Chicago, Illinois, this 27th day of November, A. D. 1884.

CHARLES G. MAYER.

Witnesses:
FRANCIS W. PARKER,
CHAS. S. BURTON.